United States Patent [19]

Kobayashi et al.

[11] Patent Number: 4,833,372

[45] Date of Patent: * May 23, 1989

[54] CONTROL CIRCUIT FOR ELECTRIC MOTOR

[75] Inventors: Mamoru Kobayashi, Atsugi; Makoto Nishimura, Kawasaki, both of Japan

[73] Assignee: Tokico Ltd., Kawasaki, Japan

[*] Notice: The portion of the term of this patent subsequent to Jun. 9, 2004 has been disclaimed.

[21] Appl. No.: 50,429

[22] Filed: May 18, 1987

Related U.S. Application Data

[63] Continuation-in-part of Ser. No. 810,290, Dec. 18, 1985.

[30] Foreign Application Priority Data

Dec. 20, 1984 [JP] Japan .................................. 59-193502
Nov. 26, 1986 [JP] Japan .................................. 61-281185

[51] Int. Cl.$^4$ .............................................. H02P 8/00
[52] U.S. Cl. ...................................... 318/696; 318/685
[58] Field of Search ................................. 318/696, 685

[56] References Cited

U.S. PATENT DOCUMENTS 4,489,260 12/1984 Matsushita ........................... 318/696
4,672,283 6/1987 Kobayashi ........................... 318/696

Primary Examiner—William M. Shoop, Jr.
Assistant Examiner—M. Bergmann
Attorney, Agent, or Firm—Cushman, Darby & Cushman

[57] ABSTRACT

A control circuit can drive an electric motor such as a stepping motor and a DC torque motor within a wide supply voltage range so that its rotor follows a selected speed pattern without error. The control circuit includes a monitoring circuit for monitoring a level of the supply voltage to output a detection signal. The control circuit also includes a memory storing a plurality of speed patterns, the plurality of speed patterns corresponding respectively to different levels of the supply voltage. One of the plurality of speed patterns is selectively read in response to the detection signal. The electric motor is then driven in accordance with the read speed pattern.

3 Claims, 6 Drawing Sheets

CONTROL CIRCUIT FOR ELECTRIC MOTOR

This is a continuation-in-part of U.S. patent application Ser. No. 06/810,290 filed Dec. 18, 1985 and allowed Dec. 4, 1986.

BACKGROUND OF THE INVENTION

1. Field of the Invention

This invention relates to a control circuit for driving an electric motor which is suitable for use, for example, in a magnetic disc storage unit.

2. Prior Art

There has been proposed a disc storage unit in which a seek operation to move the heads to the desired cylinder is performed by means of an electric motor, such as a DC electric motor and a stepping motor. It is known in the art that the electric motor can be controlled by a control circuit in such a manner that the rotor thereof is accelerated and decelerated in accordance with a predetermined unique speed pattern previously stored in an associated memory. However, such a conventional motor control circuit suffers from a deficiency that the rotor does not accurately follow the predetermined speed pattern when the supply voltage for the electric motor becomes less than the nominal value by a certain amount. The reason for this is that the motor is driven in accordance with the same speed pattern regardless of the variation of the supply voltage. For example, in the case of a DC electric motor, the rotor is not properly decelerated because of the lack of the braking force when the supply voltage is excessively low. Similarly, in the case of a stepping motor, the rotor steps out when the supply voltage is excessively low. Thus, in both cases, the low supply voltage results in a seek error in the disc storage unit. The above problems can be solved by lowering the maximum speed taken in the speed pattern of the rotor. This however, prolongs the access time of the disc storage unit.

SUMMARY OF THE INVENTION

It is therefore an object of the present invention to provide a control circuit for an electric motor which can drive the electric motor so that the rotor thereof always rotates at the optimum speeds determined in accordance with the supply voltage.

According to the present invention, there is provided a control circuit for controlling the operation of an electric motor having a winding which is supplied with a voltage from a voltage source which comprises:

(a) voltage detecting means for detecing a level of the voltage to output a detection signal;

(b) memory means for storing a plurality of speed pattern data corresponding respectively to different levels of the voltage;

(c) reading means for selectively reading one of said plurality of speed pattern data in accordance with said detection signal; and (d) drive means for causing a drive current to flow from the voltage source into the winding in accordance with said speed pattern data read from said memory means.

DESCRIPTION OF THE PREFERRED EMBODIMENTS OF THE INVENTION

A control circuit for an electric motor provided in accordance with a first embodiment of the present invention will now be described with reference to the drawings. This first embodiment is designed to drive an electric motor in the form of a stepping motor for moving read/write heads of a disc storage unit.

Figure 1:
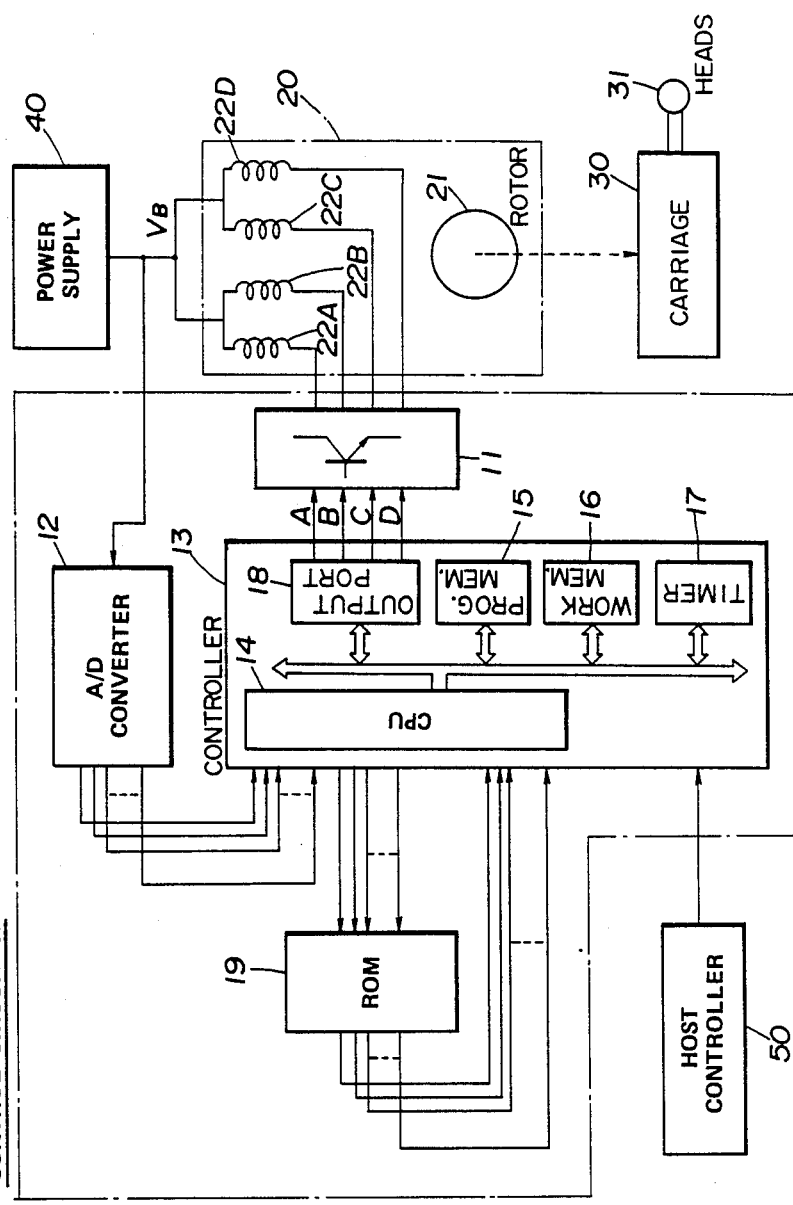
FIG. 1 is a block diagram of a control circuit for a stepping motor provided in accordance with the present invention.

Referring now to FIG. 1, there is shown a control circuit 10 for driving a stepping motor 20 which is adapted for use in a disc storage unit. A rotor 21 of the stepping motor 20 is operatively connected to a carriage 30 which carries heads 31 of the disc storage unit. Stator windings 22A to 22D of the stepping motor 20 are supplied at one ends with a positive DC voltage $V_B$ outputted from a power supply 40. The other ends of the windings 22A to 22D are connected respectively to output terminals of a driver circuit 11 provided in the control circuit 10. The control circuit 10 further comprises an analog-to-digital converter (hereinafter referred to as "A/D converter") 12 for converting the output voltage $V_B$ of the power supply 40 into a digital data. The digital data outputted from the A/D converter 12 is supplied to a controller 13 which comprises a CPU (Central Processing Unit) 14, a program memory 15, a work memory 16, a timer circuit 17 and an output port 18. The program memory 15 stores therein programs to be executed by the CPU 14 for controlling the rotation and speed of the stepping motor 20. The timer circuit 17 is of the type which is triggered by the CPU 14 and outputs, to the CPU 14, a timing signal when a time interval determined by the timer data supplied from the CPU 14 has lapsed. The output port 18 has four output terminals for outputting, under the control of the CPU 14, four phase signals A, B, C and D, one of them being selectively rendered "1". For example, when the phase signals A, B, C and D are sequentially rendered "1", the windings 22A, 22B, 22C and 22D are sequentially energized, whereby the rotor 21 is rotated by four steps. On the other hand, when the states of the four phase signals A to D do not change, the rotor 21 remains stationary. The CPU 14 is also connected to a ROM (Read Only Memory) 19 in which a plurality of speed control data are stored. The CPU 14 selectively reads, under the control of the program stored in the program memory 15, one of the speed control data from the ROM 19 in accordance with the output data of the A/D converter 12, and causes the states of the phase signals A to D to change when a time interval determined by the read speed control data has lapsed. By repeating the above operation, the control circuit 10 can rotate the stepping motor 20 in accordance with the desired speed pattern.

The speed control data stored in the ROM 19 will now be more fully described.

Figure 2:
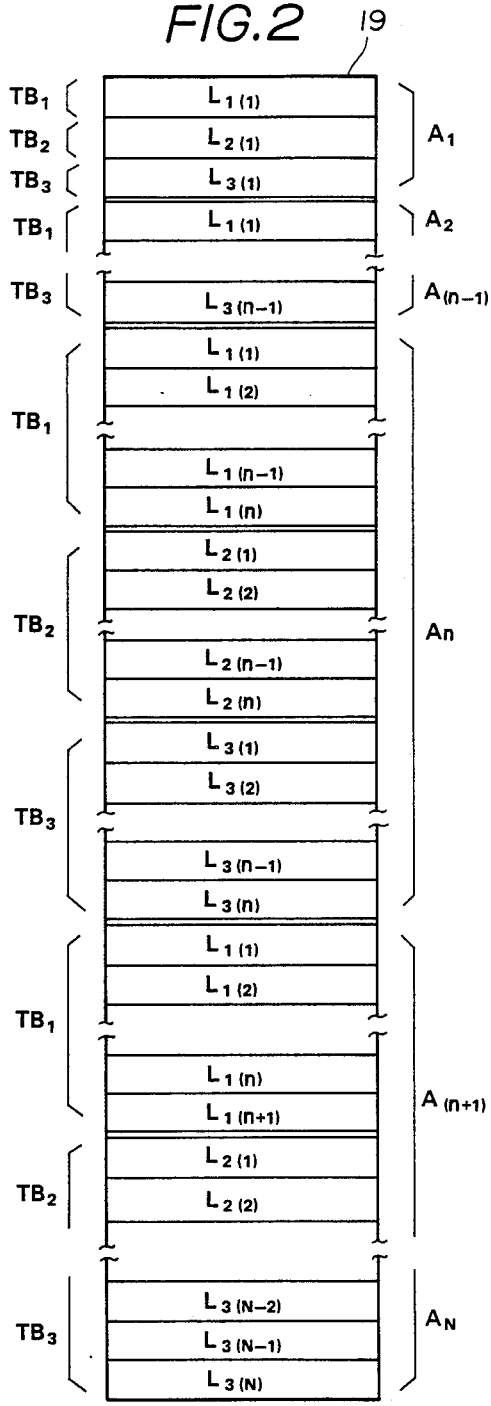
FIG. 2 is an illustration showing the speed control data stored in the ROM 19 of the control circuit 10 of FIG. 1.

As shown in FIG. 2, the ROM 19 is divided into a plurality of storage areas $A_1$ to $A_N$, wherein the suffix of each reference character "A" indicates the number of the cylinders which the heads pass to achieve a seek operation. For example, when the number of the cylinders to be passed is "n" the area $A_n$ is selected, and when the number of the cylinders to be passed is "n+1" the area $A_{(n+1)}$ is selected. Each of the areas $A_1$ to $A_N$ stores therein three groups of speed control data respectively as tables $TB_1$, $TB_2$, and $TB_3$. Three tables $TB_1$, $TB_2$ and $TB_3$ in the same area are composed of the same number of memory locations which corresponds to the number of the cylinders to be passed. For example, the tables $TB_1$, $TB_2$ and $TB_3$ in the area $A_n$ are composed respectively of memory locations $L_{1(i)}$, $L_{2(i)}$ and $L_{3(i)}$, wherein "i" represents 1, 2, 3, ... n. Thus, the area $A_n$ is composed of 3 x n memory locations. On the other hand, the tables $TB_1$, $TB_2$ and $TB_3$ in the area $A_{(n+1)}$ are composed respectively of memory locations $L_{1(i)}$, $L_{2(i)}$ and $L_{3(i)}$, wherein "i" represents 1, 2, 3, ... (n+1), so that the area $A_{(n+1)}$ is composed of $3 \times (n+1)$ memory locations.

The speed control data stored in each of the memory locations $L_{1(i)}$, $L_{2(i)}$ and $L_{3(i)}$ will now be described with reference to FIG. 3.

Figure 3:
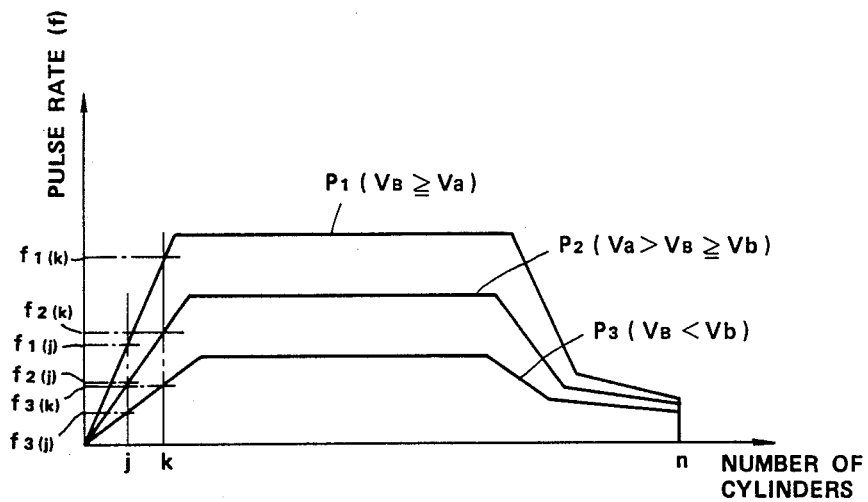
FIG. 3 is a graph showing the optimum speed patterns of the stepping motor experimentally obtained at the three different supply voltages when the heads are moved across cylinders of which number is "n"

FIG. 3 shows the relation between the number of the cylinders to be passed and the rate of change of the states of the phase signals A to D, i.e., the pulse rate f or the rotation speed of the rotor 21, in a seek operation wherein the number of the cylinders to be passed in "n". In FIG. 3, the line P1 represents the optimum variation of pulse rate (or the optimum speed pattern) for the stepping motor 20 experimentally obtained when the supply voltage $V_B$ is not less than a first reference voltage $V_a$ which is greater than the nominal supply voltage of the stepping motor 20 by a certain amount ($V_B \geq V_a$). The line P2 represents the optimum speed pattern experimentally obtained when the supply voltage $V_B$ is less than the first reference voltage $V_a$ but not less than a second reference voltage $V_b$ which is less than the nominal supply voltage by a certain amount ($V_a > V_B \geq V_b$). Similarly, the lines P3 represents the optimum speed pattern experimentally obtained when the supply voltage $V_B$ is less than the second reference voltage $V_b$ ($V_B < V_b$). As will be appreciated from the speed patterns P1 to P3, when the seek operation is started, the pulse repetition rate f is increased from "0" to accelerate the stepping motor 20. Then, the pulse repetition rate f is maintained at a constant value to rotate the stepping motor at a constant speed. When the number of the cylinders passed reaches "n", the pulse repetition rate f begins to be decreased to decelerate the stepping motor 20. In this case, two stages of deceleration are effected to stop the stepping motor 20. At the first stage of the deceleration, the pulse repetition rate f is decreased at a higher rate to quickly reduce the speed of the motor 20, and at the second stage of deceleration, the pulse repetition rate f is decreased at a lower rate to reduce the speed of the motor 20 gradually. When the number of the cylinders passed becomes equal to "n", the pulse repetition rate f is rendered "0" to stop the motor 20. It will be also appreciated from FIG. 3 that the pulse repetition rate f of the speed pattern P1 at the flat portion is the highest, and that of the speed pattern P3 is the lowest. More specifically, when the supply voltage $V_B$ is high, the motor 20 is accelerated and decelerated quickly and is rotated at a higher constant speed at the flat portion of the speed pattern. On the other hand, when the supply voltage $V_B$ is low, the motor is accelerated and decelerated gently and is rotated at a lower constant speed at the flat portion of the speed pattern.

The speed patterns P1 ($V_B \geq V_a$), P2 ($V_a > V_B \geq V_b$) and P3 ($V_B < V_b$) are stored respectively in the the tables $TB_1$, $TB_2$ and $TB_3$ in the area $A_n$. In this case, each speed pattern is stored in such a manner that the pulse period at the ith cylinder represented by the reciprocal number of the pulse repetition rate f is stored in the ith memory location of the corresponding table. More specifically, the reciprocal of the value $f_{1(j)}$ of the speed pattern P1 at the jth cylinder is stored in the jth memory location $L_{1(j)}$ of the table $TB_1$ in the area $A_n$, the reciprocal of the value $f_{2(j)}$ of the speed pattern P2 at the jth cylinder in the memory location $L_{2(j)}$, and the reciprocal of the value $f_{3(j)}$ of the speed pattern P3 at the jth cylinder in the memory location $L_{3(j)}$. Similarly, the reciprocal of the value $f_{1(k)}$ of the speed pattern P1 at the kth cylinder is stored in the kth memory location $L_{1(k)}$ of the table $TB_1$ in the area $A_n$, the reciprocal of the value $f_{2(k)}$ in the memory location $L_{2(k)}$, and the reciprocal of the value $f_{3(k)}$ in the memory location $L_{3(k)}$.

Thus, the tables $TB_1$, $TB_2$ and $TB_3$ of each of the areas $A_1$ to $A_N$ store data representative of the pulse periods to provide the optimum speed patterns of the motor experimentally obtained at the three different supply voltages, respectively. When the heads are to be moved, that one of the areas $A_1$ to $A_N$ which corresponds to the number of the cylinders to be passed is first selected. Then, the pulse-period data is read from the memory location of one of the tables $TB_1$ to $TB_3$, which memory location corresponds to the number of the cylinder which the heads are about to pass. The states of the four phase signals A to D for actuating the windings of the motor 20 are changed in accordance with the read pulse-period data, to thereby rotate the motor at the optimum speed selected in accordance with the supply voltage $V_B$.

Figure 4:
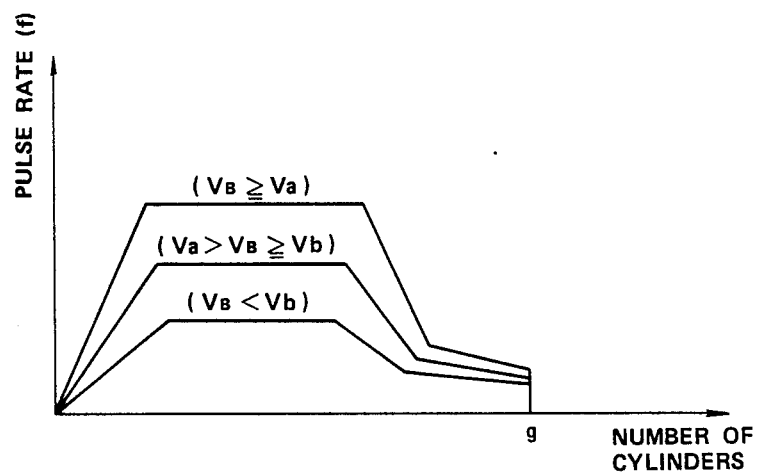
FIG. 4 is a graph similar to FIG. 3 but showing the optimum speed patterns experimentally obtained when the heads are moved across cylinders of which number is "g"

FIG. 4 shows speed patterns of the motor 20 which are used when the number of the cylinders to be passed is "g" (g < n). These speed patterns are stored in the tables $TB_1$ to $TB_3$ in the area $A_g$ (not shown) in a manner described for the speed patterns P1 to P3 shown in FIG. 3.

The operation of the control circuit 10 will now be described with reference to a flow chart shown in FIG. 5.

A seek operation of this disc storage unit is started when the CPU 14 receives data representative of the number of cylinders to be passed from a host controller 50 and stores it into the work memory 16 at step S1 (it is assumed here that the number of cylinders to be passed is "n"). Then, the CPU 14 stores data representative of "0" into a predetermined memory location SC in the work memory 16 at step S2. At the next step S3, the CPU 14 reads, from the A/D converter 12, the data representative of the voltage $V_B$, and, at the next step S4, the CPU 14 causes the output port 18 to change and then hold the states of the phase signals A to D to thereby rotate the rotor 21 of the stepping motor 20 by one step. Then, at the next step S5, the CPU 14 compares the data read from the A/D converter 12 with the data representative of the aforesaid first and second reference voltages $V_a$ and $V_b$ previously stored in the program memory 15.

(1) If it is determined, at the step S5, that the voltage $V_B$ is not less than the first reference voltage $V_a$ ($V_B \geq V_a$), the CPU 14 calculates, at step S6, the starting address of the table $TB_1$ in the area $A_n$ which corresponds to the number of cylinders to be passed.

(2) If it is determined, at the step S5, that the voltage $V_B$ is less than the first reference voltage $V_a$ but not less than the second reference voltage $V_b$ ($V_a > V_B \geq V_b$), the CPU 14 calculates, at step S7, the starting address of the table $TB_2$ in the area $A_n$ which corresponds to the numbers of cylinders to be passed.

(3) If it is determined, at the step S5, that the voltage $V_B$ is less than the second reference voltage $V_b$ ($V_B < V_b$), the CPU 14 calculates, at step S8, the starting address of the table $T_3$ in the area $A_n$ which corresponds to the number of cylinders to be passed.

Then, at step S9, the CPU 14 adds the starting address obtained by the calculation at the step S6, S7 or S8 to the contents of the memory location SC, and temporarily stores the result of the addition in a memory location PC in the work memory 16. At the next step S10, the CPU 14 outputs the contents of the memory location PC to the ROM 19 as address data to read the pulse-period data contained in that memory location of the ROM 19 designated by the address data, and at the same time triggers the timer circuit 17 with the pulse period data. Then, at the step S11, the CPU 14 determines, in accordance with the output of the timer circuit 17, whether the time interval represented by the read pulse period data has lapsed. This step S11 is repeated until the time has lapsed, and when the time has lapsed the processing proceeds to the next step S12. At this step S12, the CPU 14 increments the contents of the memory location SC by one, and determines whether the contents thereof becomes equal to the number of cylinders to be passed which has been stored in the work memory 16. If it is determined that the contents of the memory location SC is equal to the number of cylinders to be passed, the processing in this seek operation is terminated. On the other hand, if it is determined, at the step S12, that the contents of the memory location SC do not coincide to the number of cylinders to be passed, the processing returns to the step S3, whereupon the output of the A/D converter 12 is read, and then the states of the phase signals A to D are again changed to rotate the rotor 21 of the stepping motor 20 by one step. Then, in the similar manner, the next pulse period data is read from that table in the area $A_n$ of the ROM 19 which is designated in accordance with the read voltage $V_B$. When a time interval represented by the read pulse-duration data has lapsed, the rotor 21 of the motor 20 is again rotated by one step. Thereafter, the above processing is repeated until the rotor 21 is rotated by the number of steps corresponding to the number of cylinders to be passed.

As described above, according to the control circuit 10 shown in FIG. 1, the speed pattern of the stepping motor 20 is determined in accordance with the supply voltage $V_B$ so that the optimum acceleration and deceleration of the motor 20 can be achieved. Therefore, the control circuit 10 can drive the stepping motor 20 within a wide supply voltage range without any step-out of the rotor 21.

With the control circuit 10 of FIG. 1, the range of the supply voltage $V_B$ is divided into three to determine the present level of the supply voltage $V_B$. It should, however, be noted that it is also possible to divide the range of the supply voltage $V_B$ into more than three to determine the present level of the supply voltage $V_B$ more precisely.

Figure 5:
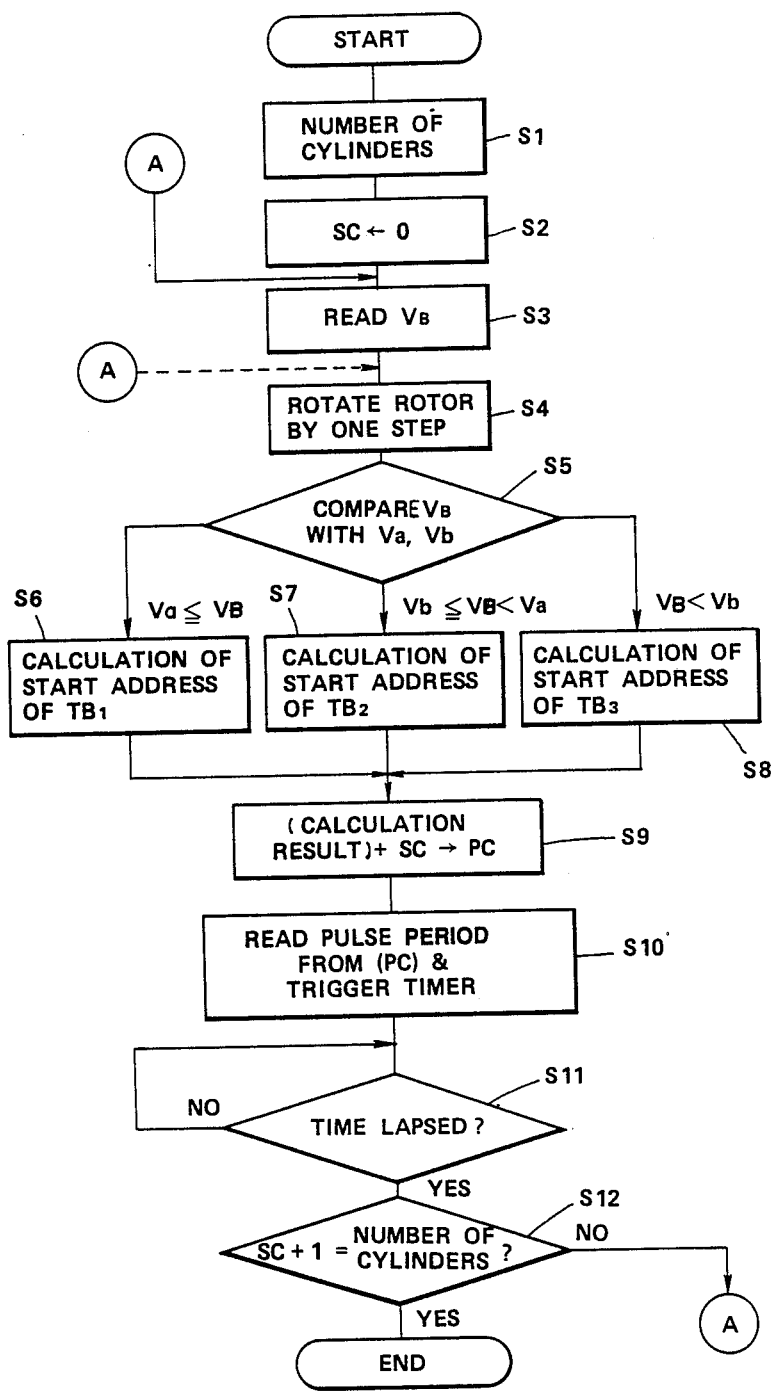
FIG. 5 is a flow chart of the operation of the control circuit 10 of FIG. 1.

With the control circuit 10, the data representative of the supply voltage $V_B$ is read from the A/D converter 12 each time the rotor 21 is rotated by one step, as seen from the flow chart of FIG. 5. It will, however, be apparent that the control circuit 10 may be modified such that the data representative of the supply voltage $V_B$ is read only once at the beginning of each seek operation, and the same data is used within each seek operation, as indicated by the broken line in FIG. 5. In this case, the pulse period data are read from the same table to control the speed of the motor 20.

Also, it is not essential for the control circuit 10 to provide the ROM 19 separately from the program memory 15. The speed control data may be stored in the program memory 15 together with the control programs.

A control circuit for controlling an electric motor according to a second embodiment of the invention will now be described. This second embodiment is designed to drive an electric motor in the form of a DC torque motor for moving heads of a disc storage unit.

Figure 6:
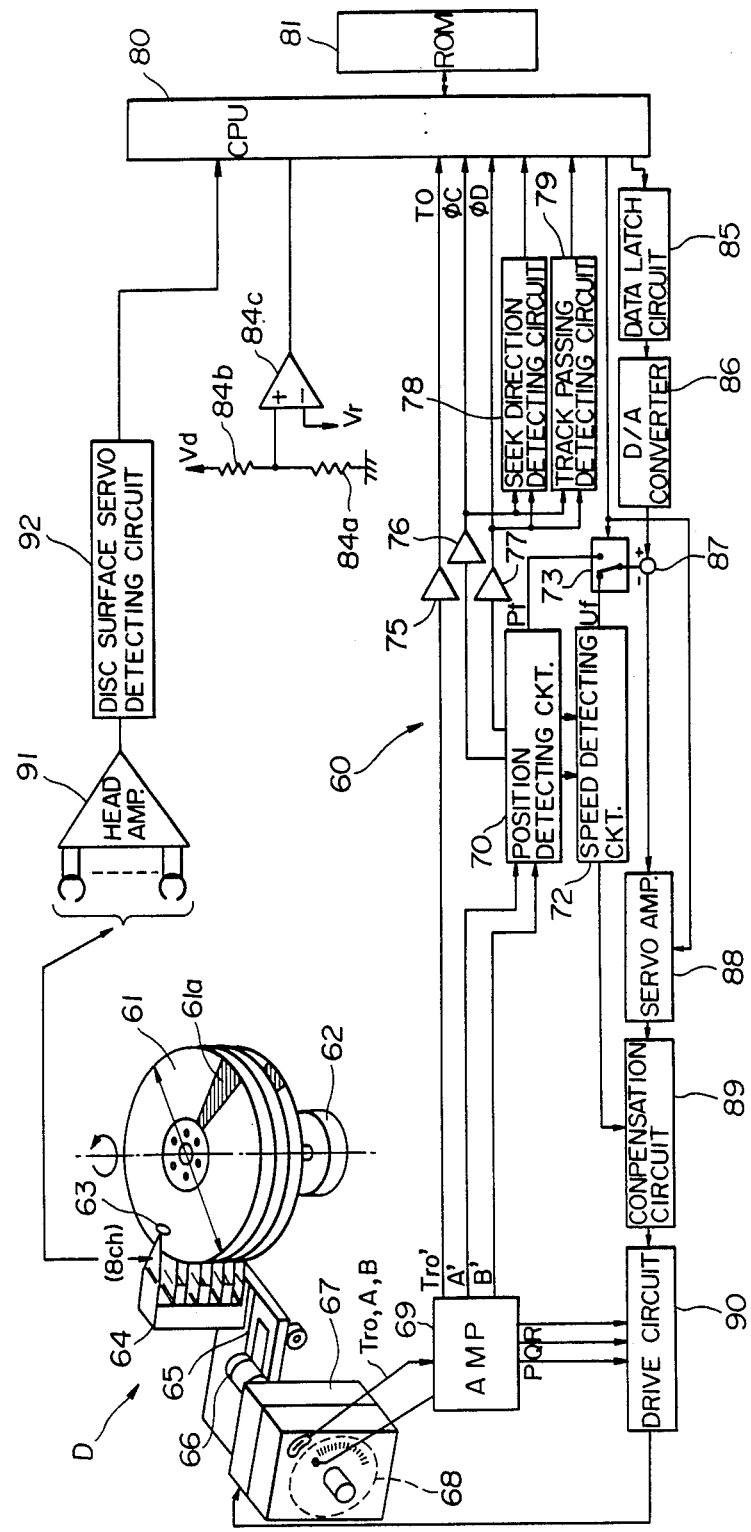
FIG. 6 is a block diagram of a control circuit for a DC torque motor provided in accordance with a second embodiment of the present invention.

Referring now to FIG. 6, a control circuit 60 for driving a DC torque motor is adapted to be connected to a disc storage unit D which comprises four hard magnetic discs 61. These magnetic discs 61 are coaxially mounted on a spindle and are rotated in unison by a spindle motor 62. Provided in opposed relation to each surface of the four discs 61 is a read/write head 63 (only one head is shown in FIG. 6). Four discs 61 provide eight surfaces, so that the number of heads 63 is eight. These heads 63 are mounted on a head carriage 64 and are reciprocally moved in unison in the radial direction of the discs 61 to be positioned at a desired cylinder or desired tracks. The carriage 64 is operatively connected, through a steel belt 65 and a pulley 66, to an output shaft of a DC torque motor 67. When the output shaft of the motor 67 rotates in the forward and reverse directions, the carriage 64 is moved linearly reciprocally with respect to the discs 61. Thus, the carriage 64, the steel belt 65, the pulley 66 and the motor 67 form a so-called linear carriage arrangement which moves the heads 63 reciprocally in the radial direction of the discs 61. The DC torque motor 67 is of the three-phase type.

Figure 7:
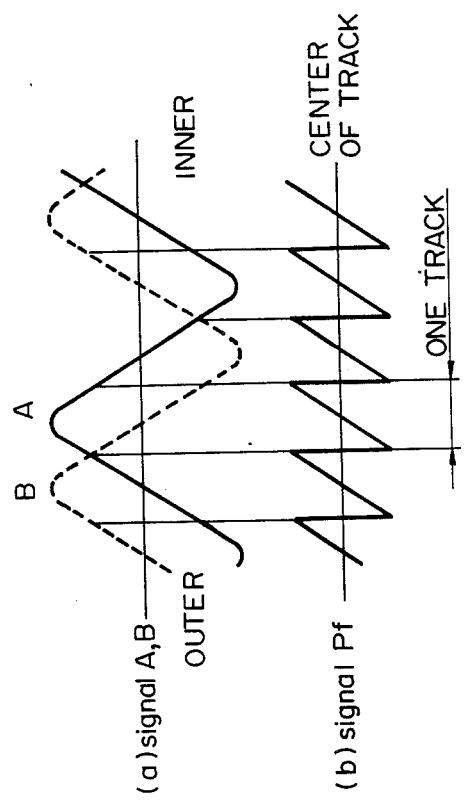
FIG. 7 is a timing chart of the phase signals A and B and the position feedback signal Pf appearing in the circuit of FIG. 6.

The motor 67 is provided with an optical rotary encoder 68 which detects the rotation angle of the output shaft of the motor 67. This encoder 68 is designed to output a zero-track signal Tr0 and a two series of phase signals A and B. In this case, the zero-track signal Tr0 is outputted only when the heads 63 are positioned at the outermost cylinder (zero tracks) of the discs 61. The phase signals A and B are sinusoidal signals, which are 90° out of phase from each other and are produced when the motor 67 rotates, as shown in FIG. 7-(a). Each of the phase signals A and B varies by one cycle during the time when each head 63 moves by four tracks. In other words, a quarter of one cycle of the phase signal A or B corresponds to one track, as shown in FIG. 7-(b).

The outputs of the encoder 68 are amplified by an amplifier/timing circuit 69. The amplified zero-track signal Tr0' is converted into a pulse signal T0 by a comparator 75 and thence supplied to a CPU 80. On the other hand, the amplified phase signals A' and B' are supplied to a position detecting circuit 70. The amplifier/timing circuit 69 also generates, from the outputs of the encoder 68, phase timing signals P, Q and R necessary for switching phase currents for the motor 67. The position detecting circuit 70 multiplies the frequency of the phase signals A' and B' by four to convert them into a sawtooth waveform signal Pf (FIG. 7-(b)) which is used as a position feedback signal, as later described. One cycle of this position feedback signal Pf corresponds to one track, and each middle point between adjoining positive and negative peaks of the feedback signal Pf coincides with the center of the corresponding track. The position detecting circuit 70 also outputs the supplied phase signals A' and B' to a speed detecting circuit 72. This speed detecting circuit 72 differentiates the phase signals A' and B' to produce a speed feedback signal Uf which represents the speed of movement of the heads 63. This speed feedback signal Uf is supplied together with the position feedback signal Pf to input terminals of an analog switch circuit 73. This analog switch circuit 73 selectively outputs the speed feedback signal Uf and the position feedback signal Pf under the control of the CPU 80, as later described.

The position detecting circuit 70 also outputs the supplied phase signals A' and B' respectively to comparators 76 and 77 which convert the phase signals A' and B' into pulse signals $\phi C$ and $\phi D$, respectively. The pulse signals $\phi C$ and $\phi D$ are supplied to the CPU 80, a seek direction detecting circuit 78 and a track passing detecting circuit 79. The seek direction detecting circuit 78 detects the direction of movement of the heads 63 from the pulse signals $\phi C$ and $\phi D$, and inform the CPU 80 of the detected direction. The track passing detecting circuit 79 detects the passing of each head 63 over a track and inform the CPU 80 of the passing.

Figure 8:
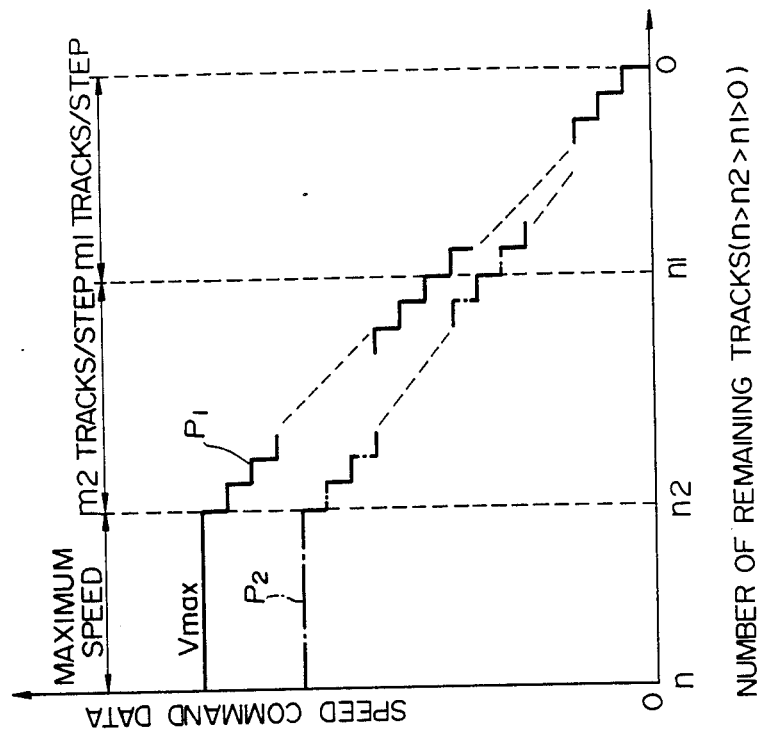
FIG. 8 is an illustration showing the speed patterns $P_1$ and $P_2$ stored in the ROM 81 of the circuit of FIG. 6.

The CPU 80 is connected to a ROM 81 which stores control programs to be executed by the CPU 80 to control the movement of the heads 63, and also stores speed patterns for the motor 67. The speed patterns are determined by the number of tracks, which the heads should pass, and the voltage Vd of the power supply for the motor 67, as shown in FIG. 8. More specifically, the ROM 81 stores two kinds of speed patterns $P_1$ (indicated by a solid line in FIG. 8) and $P_2$ (indicated by a dot-and-dash line in FIG. 8). The speed patterns $P_1$ and $P_2$ correspond respectively to the higher power supply voltages and the lower power supply voltages, and one of which is selectively used. Each of the speed patterns $P_1$ and $P_2$ is determined in accordance with the following rules.

(i) If the number n of those tracks which are to be passed to reach the desired track is greater than a predetermined value n2, the head speed is set to the maximum value determined in accordance with the supply voltage Vd.

(ii) If the number n of those tracks which are to be passed to reach the desired track is not greater than the value n2 but greater than another predetermined value n1 (n1<n2), the head speed is decreased in steps, wherein the speed is changed from one step to another each time a predetermined number m2 of tracks are passed. The predetermined number m2 is, for example, "2".

(iii) If the number n of those tracks which are to be passed to reach the desired track is less than the predetermined value n1, the head speed is decreased also in steps, wherein the speed is changed from one step to another each time a predetermined number m1 (m1<m2) of tracks are passed. The predetermined number m1 is, for example, "1".

Thus, as the head 63 approaches the desired track, the head 63 is moved slowly and in smaller steps. When the head 63 reaches the desired track, the head 63 is positioned based on the position feedback signal Pf shown in FIG. 7-(b) so that the head 63 is stopped precisely on the desired track.

Each of the above-described two speed patterns is stored in the ROM 81 as a table of data. One of the tables is selected in accordance with the power supply voltage Vd, and one of the data of the selected table is read in accordance with the number of tracks to be passed.

Referring again to FIG. 6, the voltage Vd of the power supply for the motor 67 is monitored by a power supply voltage monitoring circuit 84. The monitoring circuit 84 comprises voltage dividing resistors 84a and 84b for dividing the power supply voltage Vd and a comparator 84c for comparing the voltage at the junction point of the dividing resistors 84a and 84b with a reference voltage Vr. The output of the comparator 84c therefore becomes high when the voltage at the junction point is higher than the reference voltage Vr. The output of the comparator 84c, on the other hand, becomes low when the voltage of the junction point is lower than the reference voltage Vr. The output of the comparator 84c, which thus indicates whether the power supply voltage Vd is higher or lower than a predetermined level, is supplied to the CPU 80. The CPU 80 reads the speed pattern $P_1$ from the ROM 81 when the output of the comparator 84c is high, whereas the CPU 80 reads the speed pattern $P_2$ when the output of the comparator 84c is low.

The CPU 80 processes the read speed pattern Pi (i is 1 or 2) to form speed command data representative of the desired speed of the motor 67. This speed command data is latched by a data latch circuit 85, and is thence supplied to a D/A converter 86. The D/A converter 86 converts the speed command data into an analog signal and supplies this analog speed command signal to a subtracter 87. The subtracter 87 subtracts the speed feedback signal Uf, fed through the analog switch 73 from the speed detecting circuit 72, from the analog speed command signal, and outputs a signal representative of the difference between the two input signals to a servo amplifier 88. The servo amplifier 88 amplifies the difference signal and supplies the amplified difference signal through a compensation circuit 89 to a drive circuit 90. The drive circuit 90 drives the DC torque motor 67 with a current whose amount is determined by the difference signal. In this case, the drive circuit 90 drives the motor 67 so that the phase of the current is changed in accordance with the phase timing signals P, Q and R. Thus, a feedback control of the motor 67 is effected so that the speed of the motor 67 follows the selected speed pattern Pi.

When the head 63 reaches the desired track, the CPU 80 changes the control of the motor 67 from the speed control to the position control. More specifically, the CPU 80 actuates the analog switch circuit 73 so that the position feedback signal Pf is supplied to the subtracter 87. At this time, the CPU 80 outputs position command data, representative of the shift of the head 63 from the correct head position, to the data latch circuit 85. The position command data is formed by reading the servo data previously recorded in the servo sector 61a of the disc 61 by the head 63, by amplifying the read servo data at a head amplifier 91, and by determining the shift of the head 63 from the correct head position in accordance with the amplified servo data at a disc surface servo detecting circuit 92.

The position command data stored in the latch circuit 85 is converted into an analog position command signal by the D/A converter 86, and is thence supplied to the subtracter 87. As a result, a position feedback control of the motor 67 is effected by the subtracter 87, the servo amplifier 88, the compensation circuit 89 and the drive circuit 90 so that the head 63 comes just above the correct head position.

Thus, this embodiment differs in structure from the conventional control circuit in the following respects.

(a) The control circuit 60 comprises the monitoring circuit 84 for monitoring the voltage Vd of the power supply for the DC torque motor 67 which drives the heads 63.

(b) A plurality of series of speed patterns are stored in the ROM 81, which speed patterns correspond respectively to different voltages of the power supply.

(c) That speed pattern Pi (i is "1" or "2", in this case) corresponding to the power supply voltage Vd detected by the monitoring circuit 84 is read from the ROM 81, and the control of the speed of the DC torque motor 67 is effected in accordance with this read speed pattern Pi.

(d) The speed patterns are so arranged that the interval of tracks, at which the speed of the motor 67 is reduced in steps, becomes smaller in the vicinity of the target track.

One example of the seek operation, in which the head 63 is moved from the current track to the target track which is n tracks apart from the current track, will now be described.

The seek operation is first performed in the speed feedback control mode until the head 63 reaches a position which is in close vicinity to the target track. When the head 63 reaches the above position, the control mode is changed to the position feedback control mode, so that the head 63 is stopped precisely on the target track. The control operation in the speed feedback control mode is performed based on the speed pattern Pi shown in FIG. 8 which varies in accordance with the number of remaining tracks. On the other hand, the control operation in the position feedback control mode is performed based on the servo data previously recorded in the servo sector 61a of the disc 61.

I Speed Feedback Control Mode

In this speed feedback control mode, the CPU 80 sets the contacts of the analog switch circuit 73 to the position shown in FIG. 6 so that the speed feedback signal Uf is supplied to the subtracter 87. The CPU 80, at the same time, supplies the speed command data through the data latch circuit 85 and the D/A converter 86 to the subtracter 87. Then, the speed feedback control is performed to drive the DC torque motor 67 such that the speed command signal becomes equal in magnitude to the speed feedback signal Uf. More specifically, the difference between the speed command signal and the speed feedback signal Uf is supplied to the servo amplifier 88 so that the DC torque motor 67 is driven by the output of the servo amplifier 88 through the compensation circuit 89 and the drive circuit 90, whereby the speed of the motor 67 follows the speed command data.

In this case, the speed command data which determines the speed pattern of the motor 67, is selectively read from the ROM 81 in accordance with the voltage Vd of the power supply for the motor 67. More specifically, when the output of the monitoring circuit 84 is high, the speed pattern P1 is read, whereas when the output of the monitoring circuit 84 is low, the speed pattern P2 is read, and the speed command data is produced from the read speed pattern to effect the speed feedback control of the motor. This speed feedback control is performed in one of the following three control stages selected in accordance with the number n of the remaining tracks.

(I-a) Speed control when the number of remaining tracks is greater than n2

When the number n of the remaining tracks is greater than the predetermined value n2 shown in FIG. 8, the speed command data is rendered maximum. In this case, the CPU 80 counts the signals from the track passing detecting circuit 79 to obtain the number of those tracks which have been passed. When the number of the remaining tracks becomes equal to n2, the mode of operation is brought into the m2 track pitch control stage.

(I-b) m2 track pitch control stage

During the time when the number n of the remaining tracks is not more than n2 but more than n1, the speed command data is decreased in steps at an interval of m2 (for example, two) tracks. More specifically, the speed command data is decreased by a predetermined value each time m2 tracks are passed. When the number n of the remaining tracks becomes n1, the mode of operation is brought into the m1 track pitch control stage.

(I-c) m1 track pitch control stage

During the time when the number n of the remaining tracks is equal to or less than n1, the speed command data is decreased in steps at an interval of m1 (for example, one) tracks. More specifically, the speed command data is decreased by a predetermined value each time m1 tracks are passed, wherein the value m1 is smaller than the value m2. When the number n of the remaining tracks becomes zero, that is to say, when the head 63 reaches the target track, the mode of operation is changed to the position control mode.

II Position Control Mode

In this position control mode, the CPU 80 activates the analog switch 73 to supply the position feedback signal Pf to the subtracter 87. The CPU 80 also produces the position command data from the amount of shift fed from the disc surface servo detecting circuit 92, and supplies the data to the subtracter 87 via the data latch circuit 85 and the D/A converter 86. The CPU 80 thus controls the motor 67 so that the position feedback signal Pf becomes equal in magnitude to the signal corresponding to the position command data. As a result, the error in the transmission system provided between the optical rotary encoder 68 and the disc surface is compensated, so that the head 63 is precisely positioned on the target track.

In this manner, each seek operation is performed in accordance with that pattern of the speed patterns P1 and P2 which is most suitable for the current power supply voltage Vd. Therefore, the DC torque motor 67 is always used at its full potential. In addition, in the vicinity of the target track, the head 63 is moved in fine steps, so that the positioning of the head 63 is achieved very accurately.

With the above embodiment, the selection of the speed pattern is carried out in the beginning of each seek operation, and the selected speed pattern is used throughout the seek operation to perform the speed control. It may however be possible to change the speed pattern when the supply voltage Vd changes during a seek operation.

With the above embodiment, only two speed patterns are provided. It may however be possible to provide more than two speed patterns and to selectively use these speed patterns in accordance with the output of the monitoring circuit 84 for the power supply. Also, the track interval m1, m2 at which the speed pattern is decreased may be less than "1".

What is claimed is:

1. A control circuit for controlling the operation of an electric motor having a winding which is supplied with a voltage from a voltage source comprising:

voltage detecting means for detecting a level of the voltage to output a detection signal;

memory means for storing a plurality of speed pattern data corresponding respectively to different levels of the voltage;

reading means for selectively reading one of said plurality of speed pattern data in accordance with said detection signal;

drive means for causing a drive current to flow from the voltage source into the winding in accordance with said speed pattern data read from said memory means, and means for detecting an amount of rotation of said motor to determine a remaining amount of rotation of said motor, each of said speed patterns being so determined that (1) when the remaining amount of rotation of said motor is greater than a first predetermined value the motor is driven at the highest speed allowable at the corresponding level of the voltage, and (2) when the remaining amount of rotation of said motor is not greater than said first predetermined value the speed of the motor is decreased in steps each time the motor is rotated by a first predetermined amount.

2. A control circuit according to claim 1, wherein said each of said speed patterns is further so determined that when the remaining amount of rotation of said motor is less than a second predetermined value smaller than said first predetermined value, the speed of the motor is decreased in steps each time the motor is rotated by a second predetermined amount which is less than said first predetermined amount.

3. A control circuit according to any one of claims 1 to 2, wherein said electric motor is a DC torque motor for moving a head carriage provided in a disc storage unit.

* * * * *